United States Patent [19]

Vidakovic et al.

[11] 4,043,609
[45] Aug. 23, 1977

[54] ARMORED TIRE HAVING A FLEXIBLE TAPERED BELT ARRANGEMENT

[75] Inventors: Aleksandar Vidakovic, Libertyville; Karl Salna, Mundelein, both of Ill.

[73] Assignee: International Harvester Company, Chicago, Ill.

[21] Appl. No.: 619,757

[22] Filed: Oct. 6, 1975

[51] Int. Cl.² ............... B60C 27/20; B62D 55/28
[52] U.S. Cl. .............................. 305/19; 152/179
[58] Field of Search ............... 305/19, 35 EB, 54, 56; 152/185, 179, 187, 190, 191, 182

[56] References Cited

U.S. PATENT DOCUMENTS

| 1,373,905 | 4/1921 | Miller | 305/19 |
| 3,500,944 | 3/1970 | Farnsworth | 305/35 EB X |
| 3,773,394 | 11/1973 | Grawey | 305/38 |

FOREIGN PATENT DOCUMENTS 1,052,805  12/1966  United Kingdom ............ 305/35 EB

*Primary Examiner*—Robert B. Reeves
*Assistant Examiner*—John P. Shannon
*Attorney, Agent, or Firm*—Douglas W. Rudy; Floyd B. Harman

[57] ABSTRACT

A pneumatic spacer and cushioning tire assembly, having an armored peripheral track fitted thereto is provided for use on construction and earthworking equipment. The track assembly has a non-uniform cross section tapered belt of elastomer insulated inextensible filaments constrained between anchor plates and traction plates.

6 Claims, 9 Drawing Figures

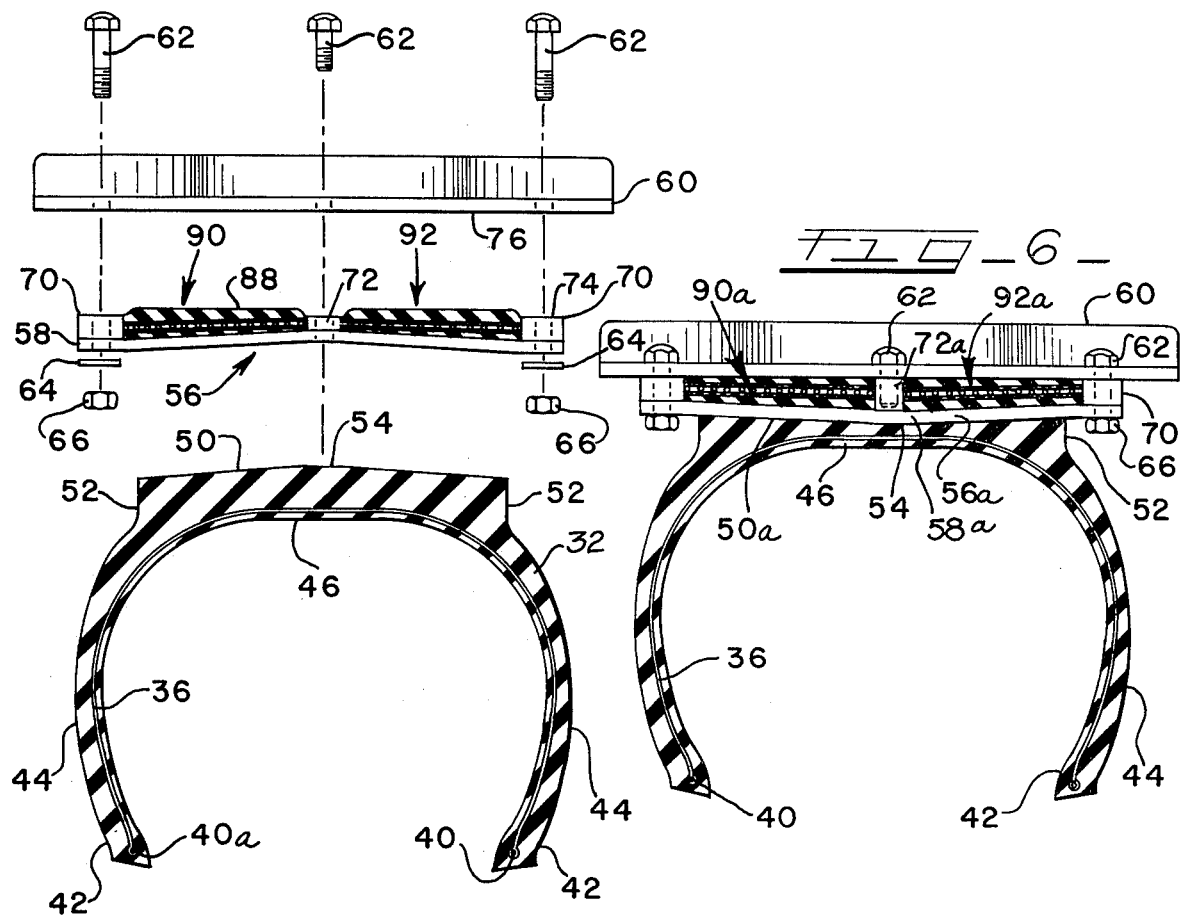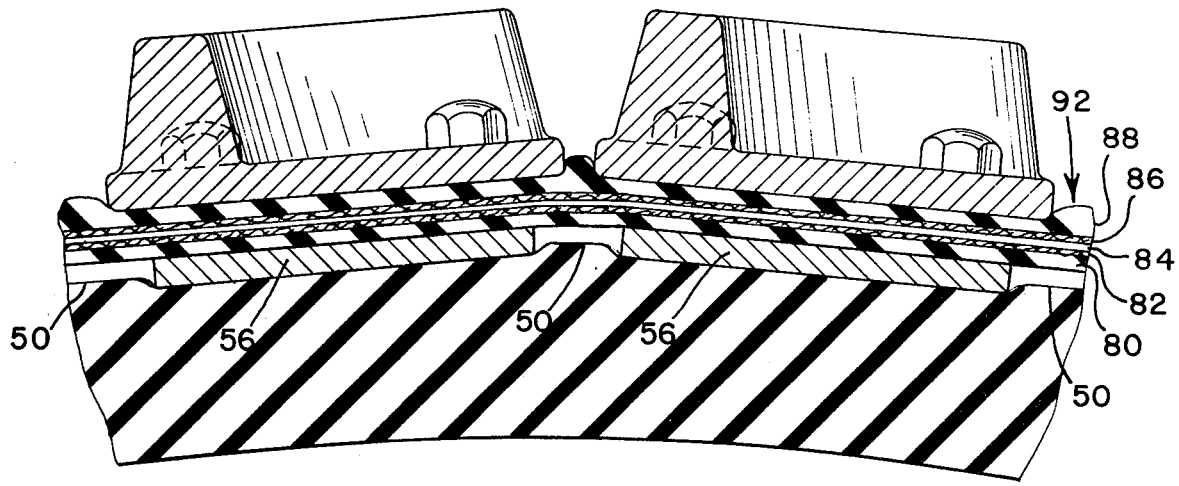

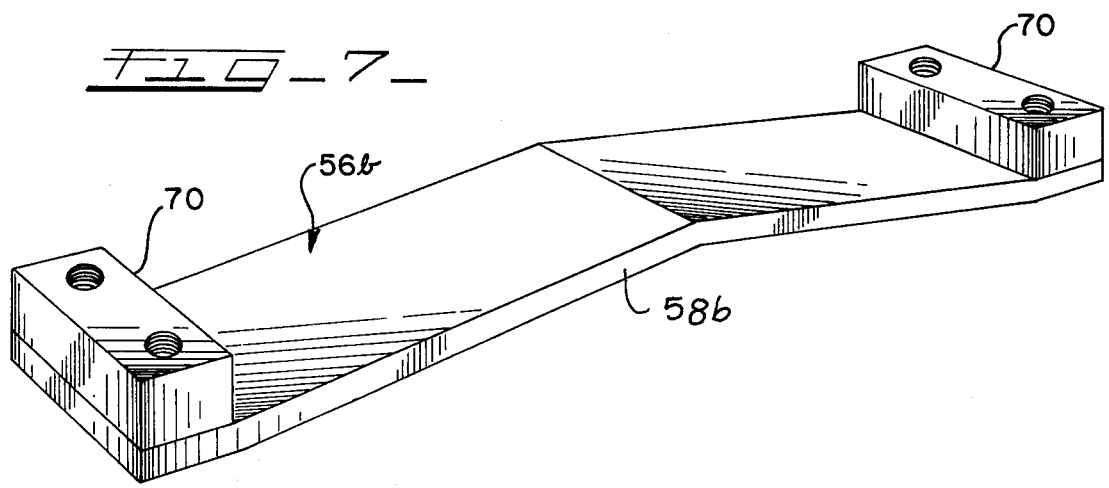
FIG_7_
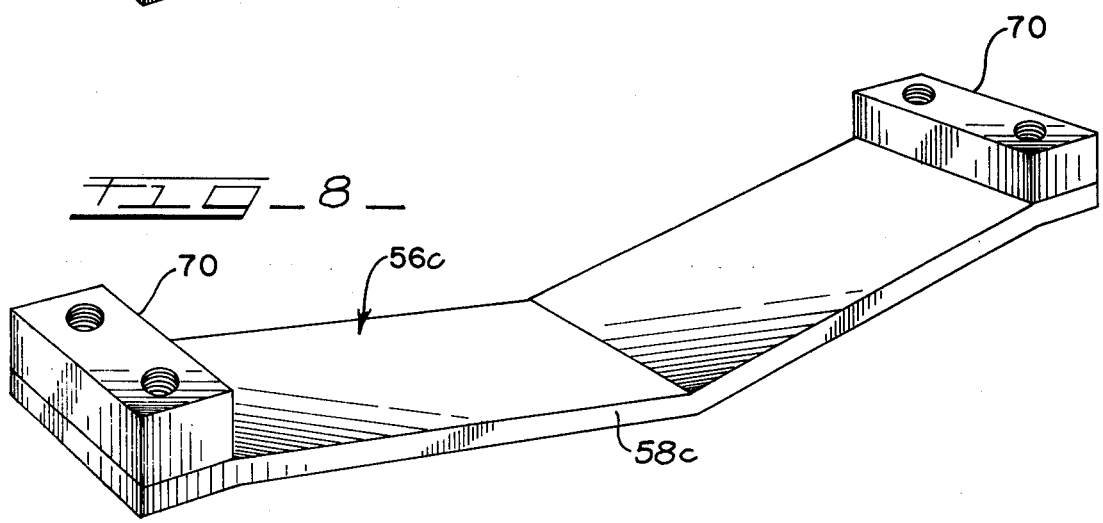
FIG_8_
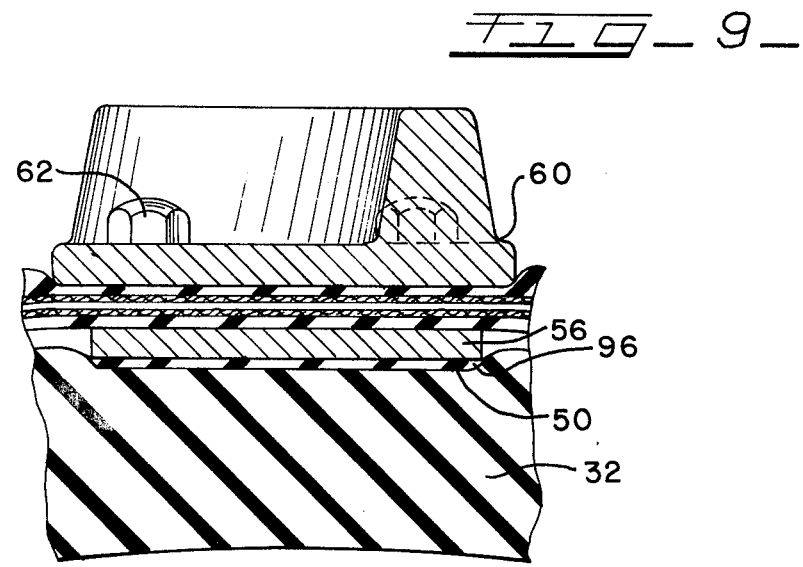
FIG_9_

ARMORED TIRE HAVING A FLEXIBLE TAPERED BELT ARRANGEMENT

CROSS-REFERENCES TO RELATED APPLICATIONS

This application is related to the application entitled ARMORED TIRE invented by Karl Salna and Aleksandar Vidakovic which was filed on the same day as this application.

BACKGROUND OF THE INVENTION

1. Field of the Invention

This invention relates to armored tires having a traction plate equipped ground engaging surface. A pneumatic tire is equipped with an armored peripheral track for use on construction and earthworking equipment.

The armored peripheral track has a belt constrained between anchor plates and traction plates. The track, with the anchor plates innermost, is disposed around the periphery of a pneumatic tire on the tread section thereof such that ground engaging traction plates radiate from the assembly.

2. Description of the Prior Art

Vehicles equipped with pneumatic tires which work in construction and other harsh environments are oftentimes driven on extremely detrimental or otherwise difficult road surfaces. Numerous articulated and conventional loaders, scrapers, dump trucks and graders, etc. operate in rock quarries, mines, foundries, refuse yards and other locations where the tires of the vehicle are continually exposed to puncture producing and wear inducing elements. Additionally, traction at some sites may be so limited that conventional rubber tired vehicles are disadvantaged.

As the tires for large construction type vehicles are expensive it is economically advantageous to minimize exposure to tire damaging elements. One way that this tire wear problem may be alleviated is through the use of endless track vehicles. These vehicles have high tractive efficiency, good stability, and good floatation characteristics. Bulldozers, power shovels, and cranes are often seen with dual endless track ground engaging means.

Conversely, endless track vehicles do have certain disadvantages that make them undesirable in some material handling applications. For instance, two track vehicles have speed limitations due to the track assembly. Heat generated by the track links may be severe enough at high speeds to cause premature failure of the tracks. Also road shock and vibration dampening characteristics are poor with conventional tracked vehicles.

On the other hand a vehicle having pneumatic tire is capable of relatively high speed. The tires also provide a major portion of the shock dampening function of the vehicle suspension. Thus for construction vehicles, such as loaders and dump trucks, which operate at high speed a pneumatic tire is more advantageous.

In some instances the traction plates used either in tracked vehicles or armored tire vehicles may be designed to have a high tractive interface between the vehicle and the ground. A tracked vehicle also may have better floatation characteristics than an untracked vehicle.

In order to realize the combined benefit of the endless track and the pneumatic tire it is highly desirous to combine the armor protection of a traction plate with the high speed capability of a pneumatic tire.

Many attempts to armor tires using plates held in position on the tire by means of chains, links, cables, etc. have beed tried for special applications. Specific examples of track linked over tires are shown in U.S. Pat. No. 3,601,212 to Peterson, et al and U.S. Pat. No. 3,612,624 to Stedman. These adaptations of linked tracks and pneumatic tires provide a shock dampening advantage as well as tire armoring, however, the linked track limits the speed of the vehicle due to the high frictional heat buildup in the linking components which may cause a high rate of wear in the components.

The troublesome link track systems have been improved upon by several inventions as typified by the invention disclosed in U.S. Pat. No. 3,773,394 to Grawey. In the Grawey invention the traction plates are fastened to anchor plates which accommodate a plurality of independent circumferential belts. This belt structure is positioned on the crown of the pneumatic tire and the tire is inflated into the belt and track structure. A continuous and flat interior belt surface contacts the pneumatic tire carcass and provides frictional engagement therewith.

The belt structure of the Grawey Patent includes an elastomer spacer between the edge of each anchor plate and the circumferential belt so that the belt surface, which contacts the crown portion of the tire or the tread portion of the tire, is smooth. Therefore a continuous interior belt surface contacts the pneumatic tire carcass and provides frictional engagement therewith.

The armored tire with the non-uniform cross section or tapered belt arrangement of this invention is adapted to be mounted on a wheel for use on an earthworking or transporting vehicle. The tire comprises a conventional, preferably radial, tire body having beads, body plies, sidewalls and a tread section in the crown thereof. The tread section would have a smooth surface shaped either in a concave or a convex manner to fit the tapered belt assembly rather than an aggressive traction surface.

The belt assembly would be constructed of non-flat anchor plates, a composite tapered non-uniform cross section belt, end spacer means, middle or center spacer means and traction plates fastened to the anchor plates such that the tapered belt is contained therebetween. Interior spaces bounded by the edges of each anchor plate, the tapered belt and the tread surface of the tire are not occupied by elastomer. As the tire and separate belt assembly is inflated on an appropriate wheel the tire will "grow" such that its tread will expand into the belt assembly allowing the partial extrusion of the tire tread surface elastomer into the previously mentioned unoccupied spaces.

The extrusion of the tread surface into the spaces between the anchor plates aids in the transmittal of torque between the tire and the belt assembly and consequently allows full transmission of torque between the vehicle and the ground surface with virtually no creep between the tire and the belt assembly in normal operation.

As the anchor plates and the tire tread surface have compatible cross sectional profiles the belt assembly tends to stay centered on the tire. The non-uniform cross section of the belt allows the traction plates to have a flat inner surface while at the same time allowing the anchor plates to have a non-flat profile. The cross sectional profile of the anchor plates may be either concave or convex depending on design preference. Of course the belt and the tire tread surface will be either concave or convex relative to the anchor plate to accommodate the appropriate non-flat anchor plate configuration.

SUMMARY OF THE INVENTION

A pneumatic tire, preferably of radial construction, is provided with an armored peripheral track assembly having a non-uniform cross section tapered endless belt or belts composed of inextensible filaments insulated in an elastomer composition contained between a plurality of anchor plates, the anchor plates having direct contact with the pneumatic tire tread surface, and a plurality of traction plates.

The anchor plates are so formed as to conform with the inner surface of the tapered belt and to compatibly conform with the exterior crown surface of the pneumatic tire. The anchor plates are concave, or alternatively convex, while the traction plates are virtually flat on the inner surface which contacts the outer surface of the tapered belt. An unoccupied zone exists between the edge surfaces of each anchor plate. When the anchor plates and traction plates have been assembled with the tapered belt therebetween, thus forming the peripheral track assembly, and the assembly is positioned on the pneumatic tire, the unoccupied zone is bounded on four sides. The tapered belt, the edges of the anchor plates and the exterior crown portion of the pneumatic tire make up the boundaries. The unoccupied zone may also be closed at each end thereof by an elastomer plug conforming to the boundaries and retained thereby.

The resulting combination of a pneumatic tire and an armored peripheral track assembly may be advantageously used on construction and earthworking equipment where the combination will provide armor protection to limit damage to the pneumatic tire, high tractive engagement between the ground and the host vehicle as well as shock and vibrationing dampening advantages. Of the more significant objects of this invention is to provide a vehicle support and cushioning system, namely an armored pneumatic tire, that increases the tractive ability of the vehicle while at the same time providing armor thereon to prevent damage to the system and extend the service life thereof.

A further object of the invention is to provide an armored peripheral track that is maintained on a tire without the need for lugs and interlocking engagement apertures and projections.

Another object of the invention is to provide a armored track system for use on a loader vehicle that allows high vehicle speed operation without detrimental effect to the peripheral track.

Another object of the invention is to provide a track assembly for use on a pneumatic tire that will not creep or slip on the tire.

Also an object of the invention is to provide a peripheral track and tire assembly where there is uniform contact pressure between the track and the tire thus providing complete sealing between the track and the tire.

A further object of this invention is to produce an armored tire at a reasonable cost that will have increased fatigue and service life.

Also an object of this invention is to provide a traction plate which is self-cleaning, has high stability and improved tractive contact with the ground.

BRIEF DESCRIPTION OF THE DRAWINGS

The invention presented herein is shown in the following drawings in which:

FIG. 3 is a section view taken through plane 3—3 of FIG. 1 showing the components of the invention and a perferred embodiment of an anchor plate in disassembled relationship.

FIG. 5 is a cross sectional view taken through plane 5—5 of FIG. 2.

FIG. 6 is an alternative sectional embodiment having components of the invention assembled together taken through plane 6—6 of FIG. 1.

FIG. 7 is a projection of an alternative anchor plate which may be used in an embodiment of this invention.

FIG. 8 is another projection of an alternative anchor plate which may be used in an embodiment of this invention.

FIG. 9 is a sectional view taken through plane 9—9 of FIG. 2 showing an alternative configuration of the engagement between components of the invention.

DETAILED DESCRIPTION OF PREFERRED EMBODIMENTS

Review of the figures will lead to the understanding of the various embodiments contemplated by this invention.

Figure 1:
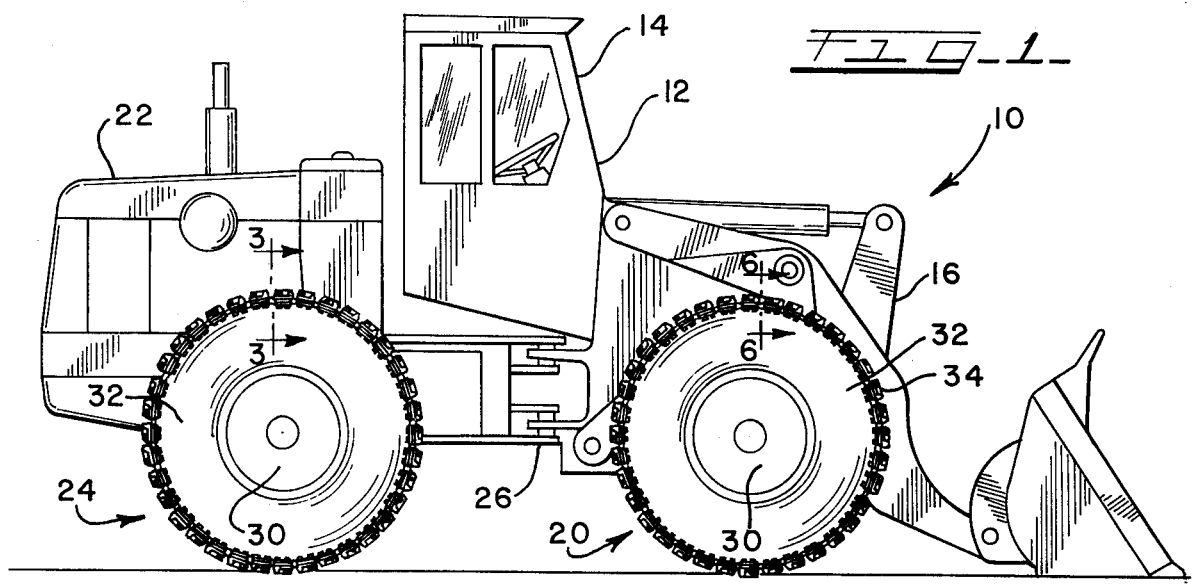
FIG. 1 is a side elevation view of an earthworking vehicle equipped with the armored tire belt arrangement of this invention.

FIG. 1 illustrates an earthworking vehicle, namely a loader, generally 10, having a forward portion 12 including an operator's cab 14 and the loader bucket apparatus 16 as well as a front drive axle assembly which includes a pair of wheel and tire assemblies, the right side assembly shown generally as 20. The rear portion of the vehicle 22 may house the prime mover of the vehicle as well as a rear drive axle assembly which includes a pair of wheel and tire assemblies. The right rear wheel and tire assembly is shown generally as 24 with a similar assembly provided on the left side of the vehicle (not shown). The front and rear tire assemblies are similar in this embodiment.

The loader vehicle 10 as shown is of the articulated type which is steered through the pivotal relationship between the forward 12 and the rear 22 portions of the vehicle around the articulation joint 26.

Figure 2:
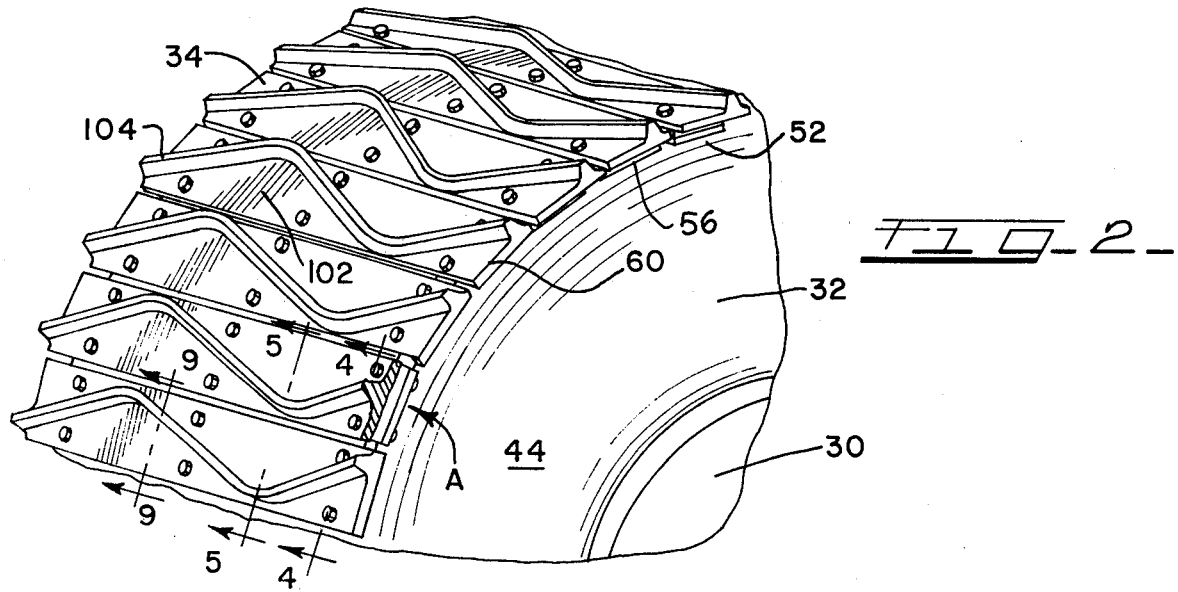
FIG. 2 is an isometric projection of a portion of a tire and a wheel assembly presenting an embodiment of the invention.

FIGS. 1 and 2 plainly show the invention as incorporated on the loader vehicle 10.

A wheel, sometimes referred to as wheel rim, 30 is carried on a axle (not shown) and supports a pneumatic tire 32 which has been inflated such that it is retained on said wheel 30. An armored peripheral track 34 is circumferentially disposed on the crown or tread surface of the pneumatic tire.

It would be helpful to refer to FIG. 3 for an understanding of the pneumatic tire preferred in this embodiment. FIG. 3 shows a cross sectional view of a pneumatic tire taken through plane 3—3 of FIG. 1. This tire 32 is basically of radial construction, that is, the cords of the body plies 36 or the carcass plies run from bend 40 to bead 40a in a virtually perpendicular relationship to the respective beads. Although only one body ply 36 is shown it is to be understood that a single or alternatively a plurality of body plies, at the discretion of the tire designer, may be used. The single body ply is shown to avoid unnecessary complication in FIG. 3. The radial tire has the usual configuration of a bead 40 (and 40a) in the bead area 42 thereof, as well as sidewalls d44 interposed between the bead areas 42 and the crown section 46. The rubber portion above crown of the tire is generally referred to as the tread section 50 which has shoulders 52 and a smooth surface. The smooth tread surface is contoured with a gently sloping profile from the center 54 of the tread 52.

The preferred embodiment of the armored peripheral track 34 previously mentioned will be explained in conjunction with FIGS. 1-5. FIG. 3 shows a single segment of the track in an disassembled orientation. Components of the track 34 included an anchor plate 56, a traction plate 60, belts, generally 90 and 92, and fastening means such as bolts 62 for use with lock washers 64 and nuts 66.

The anchor plate, generally 56, having a base plate 58 in the preferred embodiment, is equipped with a plurality of spacers such as the end spacers 70 at each outboard end of the anchor plate 56. The anchor plate of FIG. 3 is also provided with a tapped center spacer 72 located midway between each end spacer 70 on the base plate 58. The end spacers 70 are drilled with a pair of aligned holes or apertures 74 which project through the end spacers as well as through the base plate 58. These holes allow the passage of bolts 62 which are the fastening means of the assembly.

The anchor plate 56 has a cross sectional shape compatible with the preferred cross section profile of the tread section 50 of the pneumatic tire 32. Specifically, the anchor plate 56 is formed having horizontal end portions positioned under, and having the width of, the end spacers 70. Progressing inwardly from the horizontal end portions the base plate 58 of the anchor plate 56 diverges from the horizontal plane in an upward direction. The base plate is formed at an angle of approximately one and one half degrees from the horizontal from each of the respective end portions of the base plate. A preferred embodiment would have the angle set at between at least a fraction of a degree and three degrees. Angles higher than three degrees may be used, however, this may necessitate a tire with an unnecessary thick tread section.

The upward slope of each half of the anchor plate 56 progresses inward until it come to the central portion of the anchor plate under the tapped center spacer 72. The central portion of the anchor plate is horizontal with the bottom surface under the center spacer 72 and parallel to the bottom surfaces under the end spacers 70.

Looking at the anchor plate 56 of FIG. 3 the shape thereof can be clearly seen. Progressing from left to right, the lower surface of the anchor plate is first horizontal, then slopes upward from the horizon, is again horizontal in the center portion of the plate, then slopes downward to the horizontal flat under the right side end spacer 70. The horizontal flat under the leftwardly disposed end spacer is in the same horizontal plane as the flat under the rightwardly disposed end spacer 70. Sloped portions connecting each horizontal end portion to the horizontal center portion.

The contour of the top surface of the base plate is similar to the contour of the bottom surface as the base plate is uniform in thickness throughout its length. A pair of channels are formed between the end spacers 70, the center spacer 72 and the base plate 58 of the anchor plate 56.

Note that the upper surface of each of the end spacers 70 and the upper surface of the center spacer 72 are in the same plane so that they may each rest securely against the bottom surface of the traction plate 60 when fastened together without deflecting either the anchor plate or the traction plate.

The anchor plates 56, and subsequently the traction plates 60 of the armored peripheral track 34 (of FIG. 2), are related to a double belt structure in order to form a ring of anchor plates and traction plates. The belt structure is an endless belt having a laminated assembly with layers of material to give the belt strength and integrity. In this embodiment the layers, progressing outwardly from the upper surface of the anchor plate (FIG. 5), are a first elastomer layer 80 thick at one edge and sloped to a thinner second edge (the slope is not seen in FIG. 5, but is clear in FIG. 3), a first textile fabric breaker ply 82, an inextensible filament (insulated in elastomer) ply 84, a second textile fabric breaker ply 86, and finally a cap of elastomer 88. The finished belt or belts will be generally cylindrical endless belts with constant outside diameters and variable inside diameters.

The most significant component of the endless belt structures is the inextensible filament ply. These plies would be most generally cables of brass plated (for good elastomer adhesion) steel wire. This ply the belt the strength necessary to simultaneously resist the force of the pneumatic tire expanding thereinto and the tractive force generated between the traction plates and the ground. The cables 92 shown in section in FIG. 3 run circumferentially in order to conform with the outside diameter of the tire above the anchor plates and are approximately, but not limited to, 3/16 inches in diameter. The cable spacing in FIG. 3 is only representative for clarity as there would be many more cables in each belt. An alternative to the brass plate wire cable would be inextensible filaments of synthetic fibers.

The first elastomer layer 80, the first and second breaker plies and the second elastomer layer 88 cushion and isolate the inextensible filament ply 84 from damage from either the anchor plates, the traction plates, or the working environment. The second elastomer ply or cap of elastomer 88 serves another function as a torque maintenance means. Note in FIG. 3 that the top surface of the cap of elastomer 88 extends above the upper surfaces of the end spacers 70 and the center spacer 72. When the traction plate 60 is fastened to the anchor plate 56 the cap of elastomer 88 will be compressed by the bottom surface 76 of the traction plate such that the endless belts are contained under pressure between the anchor plates, the end spacers and the center spacer. It is not necessary that a portion of the cap 88 flow between the upper surfaces of the spacers and the bottom surface of the traction plate although due to manufacturing inaccuracies and stress deflection of the components a limited amount of elastomer may flow into this zone, however, this would not be detrimental to performance of the couple. The compression of the belt between the traction plate and the anchor plate will prevent movement between the traction plates and the belt and also, of course, between the anchor plates and the belt.

The preferred embodiments of the traction plates for use with this armored peripheral track would be of the "Z" grouser design. FIG. 2 presents a good view of the traction plate and shows a cast traction plate 60 having apertures which are provided for accepting fastening means. The two major components of the traction plate are the base portion 102 and a serpentine or elongated "Z" design grouser bar 104. The base plate is an elongated rectangle having a flat top surface. The grouser bar is an elongated strip which has been formed in the desired "Z" shape. The grouser bar extends from one end of the base plate longitudinally to the other with the longitudinal axis of the grouser bar arranged to coincide with the longitudinal axis of the base plate.

A non-cast version of a traction plate, where the grouser bar would be welded to the base plate, may perform equally as well as the cast version.

The "Z" grouser is a self-cleaning type of traction means. There are no closed spaces for dirt accumulation, and relative movement of the "Z" grouser with respect to the ground prevents dirt accumulation and build up. The stability of the "Z" grouser on the ground is superior to a single straight traction plate both is respect to stability against side loads and tractive ability. Also the bolt hole pattern possible with the "Z" grouser allows good attachment to the aforesaid anchor plates.

Note that the traction plates, in this embodiment the "Z" grouser, project past the ends of the anchor plates. In other words the traction plates are longer than the anchor plates. This can be seen at A of FIG. 2 where the end of a traction plate has been broken away to reveal the anchor plate. The traction plates are also longer than the width dimension of the tire from sidewall to sidewall. Not only does the traction plate increase the footprint of the track but it also serves to protect the sidewalls of the tires from upwardly projecting obstacles over which the host vehicle may be traveling.

Note that the fastening bolts 62 will attach the traction plate 60 to the anchor plate 56. The outboard bolts rely on lock washers 64 and nuts 66 to provide a fastening couple while the center bolt is threaded and torqued into the tapped center spacer. All the bolts are equally torqued to specification. It may be pointed out that the tapped portion related to the center spacer may project into the anchor plate such that the center bolt will be treadably connected to the tapped center spacer and the anchor plate. Tapping of the anchor plate is optional. Six bolts would be used in a typical traction plate to anchor plate embodiment, two at each end of the anchor plate and two in the center of the anchor plate.

The manufacturing of the armored peripheral track would be independent of the manufacture of the pneumatic tire. The pneumatic tire would be constructed in a conventional manner while the track would be somewhat unconventional. The belts or belt of the track would be assembled on a laminated drum and transferred to a forming and curing press. Before the belt or belts are molded the anchor plates (typically 36 anchor plates for tires as used on the loader vehicle 10 of FIG. 1) would be appropriately positioned in the belt mold so that the anchor plates can be bonded under temperature and pressure to the endless belts. This will increase the strength of the coupled between the anchor plates and the belts.

After the armored peripheral track 34, including the anchor plates 56, the endless belt or belts, generally 90 for the first belt and 92 for the second belt, and the traction plates 60 have been assembled together the track can be positioned on a tire. The pneumatic tire will be mounted on a wheel 30 and partially inflated. The track assembly 34 will be positioned circumferentially around the periphery of the pneumatic tire such that the center of the tread 54 is aligned with the center portions of the anchor plates. When the armored peripheral track is in position the pneumatic tire is inflated to the design inflation pressure and the tread section 50 of the tire is tightly engaged with the track due to the radial growth or expansion of the carcass. As previously mentioned the interior circumference of the track is just slightly less than the circumference of the tire around the tread. FIG. 5 shows that a portion of the tread 50 may be extruded between the anchor plates 56. This combination of tight fit between the tire and the track and extrusion of rubber into the void between the anchor plates due to the compressive load thereon prevents slipping or creeping betwen the anchor plates and the tire.

This extrusion is desirous as it aids in the transmission of torque between the tire and the track assembly. There is no need to have any retaining lugs as the peripheral track is self-contained through the tire inflation pressure. The tire carcass surface remains continuous both circumferentially and transversely without any channels or grooves.

The tapered endless belt assembly as positioned by the anchor plates precludes the need for belt centering lugs. The profile match between the anchor plates and the tread surface of the tire work together to keep the track centered on the tire. Due to the tapered configuration of the components and freedom to build tire profile while the tire is being inflated tire to belt contact pressure will be uniform throughout the tire profile. The tapered belt arrangement, with a properly shaped tire, will seal the tire to the track assembly especially at the tire shoulders.

The life of the track belts is increased over prior art devices by the elimination of the elastomer filler between the anchor plates. As shown in FIG. 5, in this embodiment the space between anchor plates is void except for the material extruded into the cavity from the tread section of the tire. The belt may flex over a thinner section thus increasing the belt components service life.

Figure 4:
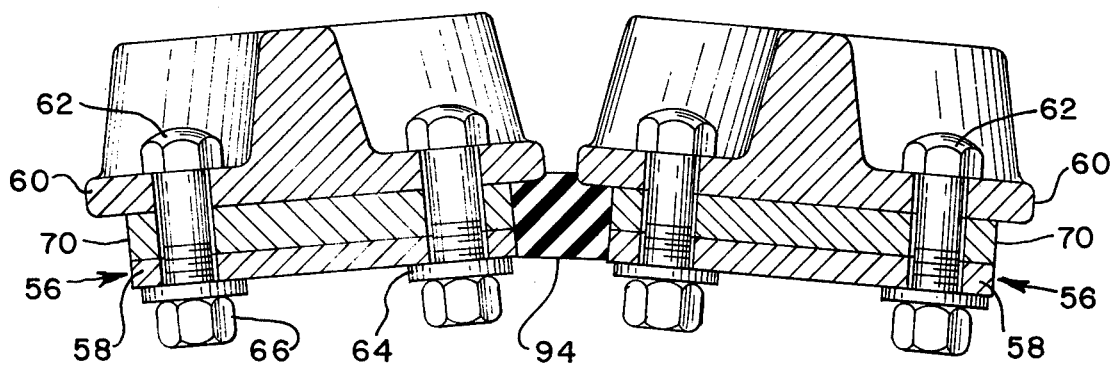
FIG. 4 is a cross sectional view taken through plane 4—4 of FIG. 2.

FIG. 4 shows a section view of the armored peripheral track at the outboard end thereof. Shown are the anchor plates 56, specifically the base plates 58, the end spacers 70, the traction plates 60 and appropriate fastening means 62, 64, and 66. Also shown is an elastomer plug 94 which may be inserted between the anchor plate and end spacers of adjacent assemblies. The plug will penetrate to the outboard edge of the belts and contact the end spacers, anchor plates and traction plates of adjacent assemblies. The plug 94 is provided to aid in the exclusion of foreign material from the void between the anchor plates, the tire tread surface and the belts.

Several alternative embodiments of the invention are shown in FIG. 6 through 9.

FIG. 6 shows an embodiment very similar to that previously described with the different being that the profile of the anchor plate 56a has been inverted from that shown in FIG. 3. In FIG. 6 the center bolt 62 is not threaded to the base plate 58. In this embodiment the tapped center spacer 72a would be welded to the base plate 58. Incidentially FIG. 6 shows the traction plate bolted in place to the anchor plate and the track in position on the tire. This may reinforce the concept of the component arrangement of FIG. 3 in the assembled state.

The identifying numerals for FIG. 3 and FIG. 6 are the same with different configurations of the same component subscripted with a lower case a.

This second embodiment has a pneumatic tire having a tread section 50a sloped inwardly from the shoulders 52 of the tread to the center of the tread 54. The anchor plate 56a as seen in profile from the end spacers begins with the lower surfaces of the base plate being horizontal. The base plate is then formed such that it slopes below the horizontal to a center portion under the center spacer which is also horizontal in a different plane from the end spacers. This alternative anchor plate 56a has basically a reverse slope when compared with the anchor plate 56 of FIG. 3.

FIGS. 7 and 8 show anchor plates similar to those used in the previous embodiments, however, they have the center lugs removed. In an armored peripheral track using the anchor plates without the center lugs 72 or 72b a full width double tapered belt of similar construction to the belt shown generally as 92 in FIG. 5 would be used. This belt would be continuous in width between the end spacers 70 of either of the FIG. 7 or 8 embodiments. There would be no need to use two separate belts and one full width belt would be preferential.

The base plate 58b of the anchor plate 56b of FIG. 7 may be considered convex as the center of the base plate is higher than the end portions thereof. In FIG. 8 the reverse plate deflection is seen. The base plate 58c may be considered concave as the center of this base plate is lower than the end portions thereof. Sloped portions have opposite slopes and are connected in the center of the base plate and are connected to the horizontal end portions of the base plate.

FIG. 9 is a sectional view of a traction plate-anchor plate assembly as taken through plane 9—9 of FIG. 2. In this alternative embodiment it is noted that the traction plate 60, the anchor plate 56, the belts 92 and the fastening means 62, 64, and 66 are all as described in the preferred embodiment. A deviation from the preferred embodiment involves the use of an anchor plate lining pad 96 which is positioned between each anchor plate 56 and the tread surface 50 of the pneumatic tire 32. This anchor plate lining pad 96 is of an elastomer material generally conforming dimensionally with the anchor plate surface which is in contact with the tread section of the tire. The lining pad 96 may assist in providing a good couple between the armored peripheral track 34 and the pneumatic tire 32 in some situations as any irregularities in either the base of the anchor plate or the tread of the tire will be filled with elastomer of the lining pad.

Although several embodiments of the invention have been set forth above, several other alternative embodiments would fall within the scope of this invention. For instance, the pneumatic tire, specifically recited as a radial construction tire, could alternatively be a conventional bias construction tire, a belted-bias construction tire, a belted-radial construction tire, or a spirally wrapped toroidal tire such as described in U.S. Pat. No. 3,606,921 to Grawey.

Thus it is apparent that there has been provided, in accordance with the invention, an armored tire having a flexible tapered belt arrangement that fully satisfies the objects, aims, and advantages set forth above. While the invention has been described in conjunction with specific embodiments thereof it is evident that many alternatives, modifications and variations will be apparent to those skilled in the art in light of the foregoing description. Accordingly, it is intended to embrace all such alternatives, modifications and variations as fall within the spirit and broad scope of appended claims.

What is claimed is:

1. An armored peripheral track comprising:

first and second inextensible belts each having a first elastomer layer tapered in cross section from a first edge thereof to a second edge thereof; a first textile fabric breaker ply positioned on said first elastomer layer; an inextensible filament ply constructed of cables insulated in elastomer, said cables disposed longitudinally, spirally and circumferentially to present an endless ply; a second textile fabric breaker ply positioned on said inextensible filament ply; a cap of elastomer positioned on said second textile ply and presenting an outside diameter of said belts;

a plurality of anchor plates disposed circumferentially around the inside diameter of said first and said second tapered inextensible belts at spaced apart intervals, transversely oriented to said belts, said anchor plates being formed with channel portions to conform to and preserve said tapered cross section of said first and said second belts, said anchor plates further equipped with end spacers having apertures and center spacers being tapped;

a plurality of traction plates having a plurality of apertures, disposed circumferentially around the outside diameter of said first and said second tapered inextensible belts in an orientation transverse thereto at spaced apart intervals corresponding to the stated location of said anchor plates;

fastening means passing through said apertures in said anchor plates and said apertures in said traction plates for forming a couple therebetween which compresses said first and said second belts and provides, through the location of said traction plates, an armored peripheral track surface on the outside diameter of said belts and an interrupted surface on the inside diameter of said belts through the location of said anchor plates.

2. The invention in accordance with claim 1 wherein said armored peripheral track further comprises an elastomer plug placed between adjacent anchor plate and traction plate assemblies at the outboard ends thereof whereby the spaces between said anchor plates are sealed at the outboard ends thereof.

3. An armored peripheral track for use on an inflatable pneumatic tire and wheel assembly having a double tapered crown portion comprising:

a double tapered inextensible belt, having inextensible filaments insulated elastomer, forming a cylindrical endless belt having an outside diameter constant across the belt and an inside diameter which varies across the belt such that the belt is double tapered with one cross sectional half having a positive slope and the other cross sectional half having a negative slope similar to and campatible with the double tapered crown portion of the pneumatic tire;

a plurality of anchor plates disposed circumferentially around the inside diameter of said double tapered inextensible belt, at spaced apart intervals, transversely oriented to said belt, the anchor plates including base plates with horizontal end portions and a pair of sloped portions having opposite slopes meeting at the center of the base plate whereby said base portion conforms to the predetermined contoured crown shape of the tire, said anchor plates being formed with a double tapered channel to conform to and preserve said double tapered cross section of said belt;

a plurality of traction plates disposed circumferentially around the outside diameter of said double tapered belt in an orientation transverse thereto at spaced apart intervals corresponding to the stated location of said anchor plates;

fastening means passing through said anchor plates and said traction plates for forming a couple therebetween which compresses said double tapered belt and provides, through the location of said traction plates, an armored peripheral track surface on the outside diameter of said belt and an interrupted surface on the inside diameter of said belt through the location of said anchor plates whereby said armored peripheral track is maintained on said pneumatic tire and wheel assembly by inflating said pneumatic tire into said armored peripheral track and centered thereon through the compatible association of said anchor plates to said double tapered crown portion of said pneumatic tire.

4. The invention in accordance with claim 3 wherein said armored peripheral track further comprises an elastomer plug placed between adjacent anchor plate and traction plate assemblies at the outboard ends thereof.

5. The invention in accordance with claim 3 wherein said base plate is convex with the center of the base plate higher in horizontal elevation than the end portions thereof.

6. The invention in accordance with claim 3 wherein said base plate is concave with the center of the base plate lower in horizontal elevation than the end portions thereof.

* * * * *